United States Patent [19]

Boyd et al.

[11] Patent Number: 4,974,500
[45] Date of Patent: Dec. 4, 1990

[54] HOT BEVERAGE PREPARATION AND DISPENSING CART

[75] Inventors: David D. Boyd, Portland; Michael W. Johnson, St. Helens, both of Oreg.

[73] Assignee: Boyd Coffee Company, Portland, Oreg.

[21] Appl. No.: 415,199

[22] Filed: Sep. 29, 1989

[51] Int. Cl.⁵ .......................... A47B 77/08; A47J 31/00
[52] U.S. Cl. .......................................... 99/279; 4/516; 99/484; 221/96; 312/3
[58] Field of Search ................. 99/275, 279, 484, 485; 312/228, 3; 221/96; 222/626, 65; 4/516

[56] References Cited

U.S. PATENT DOCUMENTS

| | | |
|---|---|---|
| 2,461,197 | 2/1949 | Chambers . |
| 2,547,481 | 4/1951 | McDonald ............................ 99/275 |
| 2,707,911 | 5/1955 | Charpiat ............................... 99/275 |
| 2,750,076 | 6/1956 | Welty et al. . |
| 2,760,207 | 8/1956 | Glintz ..................................... 4/516 |
| 3,578,126 | 5/1971 | Adams .................................. 221/96 |
| 3,949,902 | 4/1976 | Thompson . |
| 4,076,349 | 2/1978 | Gettleman et al. . |

*Primary Examiner*—Robert W. Jenkins
*Attorney, Agent, or Firm*—Kolisch, Hartwell & Dickinson

[57] ABSTRACT

A portable cabinet is provided for facilitating the operation of espresso and coffe-making machines and for the merchandising of espresso and coffee. The cabinet includes a counter top with at least two beverage preparation stations at different levels, one for preparing espresso and the other for preparing coffee. An internal fresh water supply and plumbing system enables the cabinet to be used at locations where a continuous supply of fresh water is unavailable. Filtered water from a holding tank is supplied to both beverage preparation stations on the top counter. A power distribution system built into the cabinet supplies electric power to both beverage preparation stations and to built-in lighting within the canopy which extends over the top counter. An internal waste water collection system drains waste water from the espresso-making machine to a waste water holding tank. A sink is built into the top counter, including a water faucet with water supplied from the fresh water plumbing system and a drain which drains to the waste water holding tank. Protective devices within the cabinet prevent overflow when filling the fresh water holding tank and alert the person working behind the cabinet to an overflow condition in the waste water holding tank. Another device automatically protects the espresso-making machine against damage from operation when the fresh water holding tank is empty. Sufficient storage space for coffee and espresso-making supplies and a large refrigerator are built into the cabinet.

20 Claims, 4 Drawing Sheets

HOT BEVERAGE PREPARATION AND DISPENSING CART

BACKGROUND AND SUMMARY OF THE INVENTION

This invention relates generally to portable serving carts from which beverages are prepared and served. More particularly, the invention relates to portable cabinets suitable for the preparation of espresso, coffee and other hot beverages.

The preparation and serving of hot coffee beverages such as espresso, cappuccino and coffee to patrons in commercial quantities requires the use of restaurant-grade appliances in a clean and attractive setting. Sufficient lighting and work space, easy maintenance and convenient access to the supplies needed in beverage preparation are also important. Dispensing hot beverages such as espresso from a portable cart is a particular challenge because it must be prepared fresh and often is served with steamed milk, cream or other flavorings. Water, power, refrigeration for the milk and suitable counter space must all be provided. Automatic espresso-making appliances are expensive and subject to relatively costly damage if operated for even a short time without water. Consequently, any portable water supply must be reliable.

Espresso and gourmet coffee are increasingly popular, and the preparation and serving of such hot beverages in locations remote from a direct water supply is often desirable. Hotel and office building lobbies, convention hall corridors, outdoor cafes, airport lounges and other public places without water hookups often make desirable locations to serve such hot beverages. Prior art systems overcome the lack of a continuous water supply by such expedients as manual filling of the espresso and coffee appliances or through use of holding tanks and pumps, but the former is inconvenient and the latter can present the problem of "stale" or off-flavored water from storage in a tank. Other problems confronting a vendor attempting to prepare espresso, coffee or other hot beverages from a portable serving cart include the disposal of waste water generated during the preparation process. Waste water reservoirs on portable carts can overflow, which is harmful both for aesthetic reasons and because water containing coffee residues can seriously damage carpets, wood and other types of flooring.

Successful preparation and serving of espresso and gourmet coffee requires a visually pleasing, well lighted serving counter and an efficient work space for the preparer behind the counter, free of power cords or hoses. A refrigerator and storage space for cups, condiments and coffee supplies are also necessary. Ideally, a sink and faucet will be available to permit the server to maintain the serving counter in the highest state of cleanliness and to provide a place for disposing of unconsumed beverages.

It is an object of the present invention to provide a portable cabinet which supports and enhances the operation of hot beverage preparation appliances, such as espresso or coffee-making machines.

It is a further object of the present invention to provide a portable cabinet which incorporates a self-contained water supply and waste water disposal system, in which the water supply system has a degree of cleanliness and purity appropriate for the preparation of espresso and gourmet coffee.

It is another object of the present invention to provide such a portable cabinet which includes all the items necessary to the preparation of espresso, gourmet coffee and other hot beverages, including such items as a refrigerator for milk and other perishables, storage space for supplies necessary to prepare and serve hot beverages and an overall design which is efficient and easy to keep clean.

Accordingly, the present invention provides a portable cabinet for supporting and facilitating the operation of hot beverage preparation appliances, such as espresso-making or coffee-making machines, and for the dispensing of such hot beverages. The portable cabinet of the present invention comprises a rectangular frame which is mounted on a plurality of wheels. The cabinet is enclosed by two parallel end panels on the frame which form the sides of the cabinet, a rectangular front panel on the frame forming the front of the cabinet and a rear panel on the frame forming the rear of the cabinet. The rear panel is parallel with the front panel and includes means forming openings for the installation of doors, drawers and indicators and to accommodate a refrigerator built into the cabinet. A counter top is provided on the top of the cabinet for supporting hot beverage preparation appliances and for providing a work space and serving counter.

The counter top of the cabinet is divided physically into two horizontal surfaces at different levels relative to the frame, termed first and second surfaces. The first surface defines a recess within a portion of the second surface. The second surface, which is the higher of the two relative to the frame, extends to the front and sides of the cabinet, adjoining the front and side panels at the top, front and side edges of the rectangular cabinet. A ridge is included as part of the second surface at the level of the second surface, extending around the recessed first surface along the front and sides of the cabinet. Liquids on the lower-level first surface, within the recess, are thereby prevented from flowing over the front and sides of the cabinet. The recessed first surface extends to the rear of the cabinet. First and second hot beverage preparation stations are located, respectively, on the first and second surfaces of the top counter. The first hot beverage preparation station is located on the lower level, in other words the recessed first horizontal surface. The second hot beverage preparation station is located on the upper level, i.e. the second horizontal surface. In the preferred embodiment of the invention, the lower level, which includes the first hot beverage preparation station, is designed to accommodate an espresso machine and the upper level, which includes the second hot beverage preparation station, is designed to accommodate a coffee maker.

A sink is provided on the top counter within the first surface recessed area. The sink is itself recessed into the first surface and has a water faucet and a drain.

In order to supply clean water for making espresso, coffee or other hot beverages, a first holding tank is provided on the frame for receiving and storing clean water. A water supply means, in the form of suitable plumbing within the cabinet, supplies water to the first and second hot beverage preparation stations on the respective first and second surfaces of the top counter, and to the water faucet on the sink. Water for the water supply means is taken from the first holding tank.

A power supply is provided on the frame for receiving electric power from a source external to the cabinet and for distributing electric power to a plurality of locations in the cabinet, including the first and second hot beverage preparation stations. The power supply also preferably distributes electric power to various other devices within the cabinet such as sensors, pumps, alarm systems and the like.

A canopy extends over the counter top of the cabinet. The canopy is supported on the frame by a plurality of vertical members. The canopy preferably includes a plurality of fluorescent light fixtures inside for illuminating the counter top. Mounted within the canopy are a plurality of cup dispensers which are supported on the canopy, and from which empty cups are dispensed. In its preferred form, the cup dispensers are oriented horizontally with cups disposed in the dispensers, nested one within another. Cups are accessible from the rear of the canopy, which corresponds to the rear of the cabinet.

Other features of the preferred embodiment of the present invention include provision for a second waste holding tank for collecting waste water produced in the preparation of hot beverages and for collecting liquids from the drain of the sink. Hose connections are provided on the exterior of the cabinet, including a fill hose for supplying clean water to the first holding tank and a drain hose for draining the waste tank. The fill and drain hose connections are preferably incompatible with one another so no inadvertent use of the incorrect hose can take place. Hot water is supplied to a hot water faucet on the sink as part of the water supply system by means of an internal hot water-heater.

DETAILED DESCRIPTION OF THE PREFERRED EMBODIMENT

Figure 1:
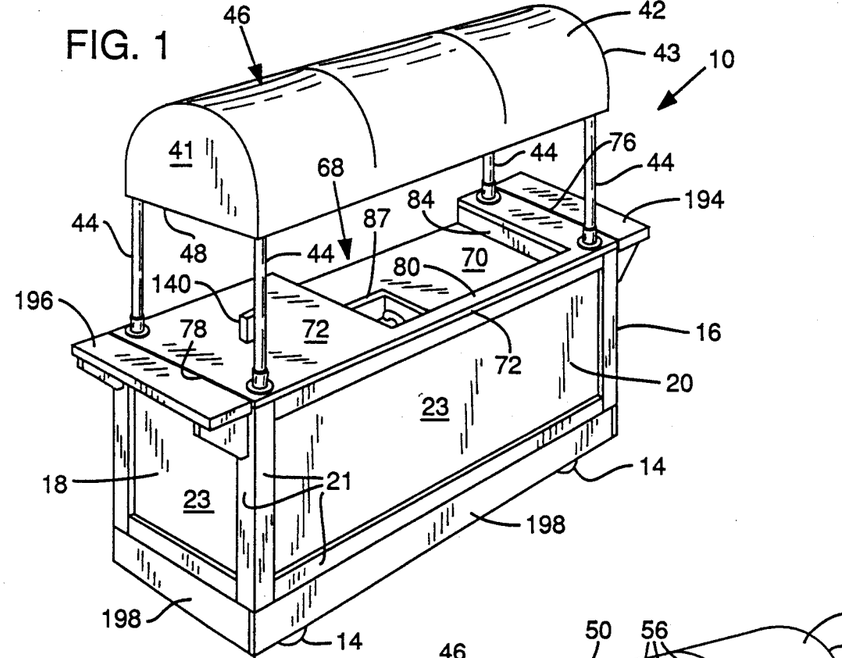
FIG. 1 is a perspective view of a portable cabinet according to the present invention, as viewed from the front or customer side of the cabinet.
Figure 2:
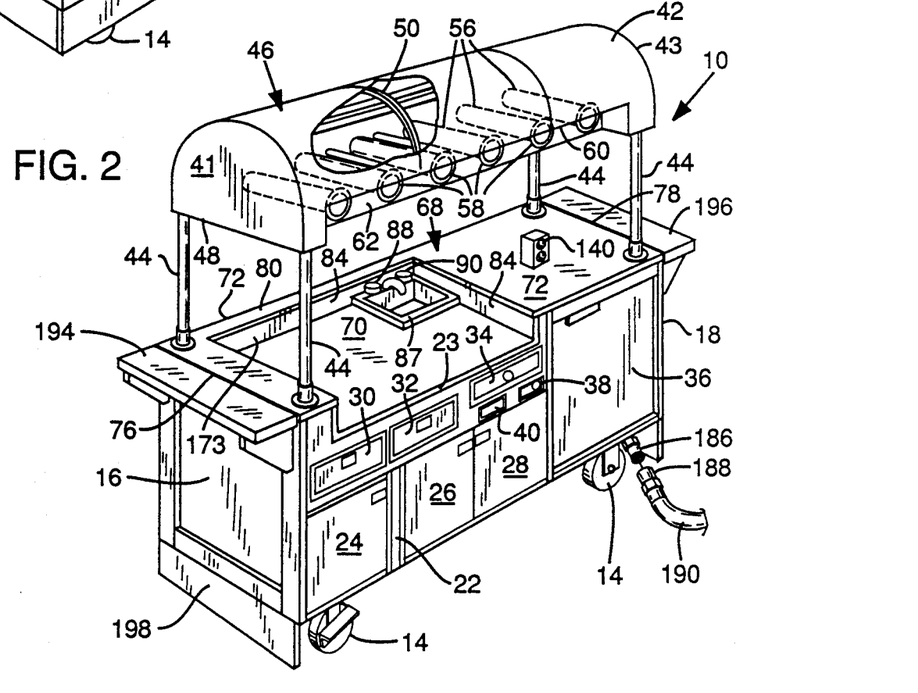
FIG. 2 is a partially schematic rear perspective view, partially cut-away, of the cabinet of FIG. 1, viewed from the rear or preparer's side of the cabinet.

Referring to FIGS. 1 and 2, a portable cabinet 10 is provided according to the present invention for supporting and facilitating the operation of hot beverage preparation appliances such as espresso-making or coffee-making machines. Cabinet 10 is also suitable for dispensing and serving hot beverages such as espresso, cappuccino, gourmet coffee or the like. Cabinet 10 is constructed on an internal frame underlying its structure made of tubular steel covered with stainless steel panels to meet National Sanitation Foundation standards for restaurant equipment. The frame is mounted on a plurality of wheels 14, two of which are preferably caster-type wheels to facilitate steering the cabinet as it is moved. The frame is generally rectangular and enclosed at its smaller ends by two parallel end panels 16 and 18, which form the sides of the cabinet. A rectangular front panel 20 mounted on one long side of the frame forms the front of the cabinet. The front and side panels can be covered, if desired, by trim strips 21 made of wood and panels of sheet material 23 containing merchandising information.

A rear panel 22, which is parallel with front panel 20 forms the rear of the cabinet, as shown in FIG. 2. Rear panel 22 is generally rectangular but includes an indentation 23 along its upper edge to accommodate different levels in the top of the cabinet, as described below. A plurality of openings are formed in rear panel 22 to provide access to the interior of the cabinet. Access to the cabinet interior, for servicing equipment and the like, is also available by removing front panel 20. The openings in rear panel 22 include openings to accommodate a plurality of hinged doors 24, 26 and 28, a plurality of drawers 30, 32 and 34, and a refrigerator 36. Additional openings 38 and 40 accommodate other devices which will be described below. Back panel 22 is formed of stainless steel, as are doors 24, 26 and 28, the exposed surfaces of drawers 30, 32 and 34, and refrigerator door 36, to permit easy cleaning and to comply with National Sanitation Foundation standards.

Figures 7, 8:
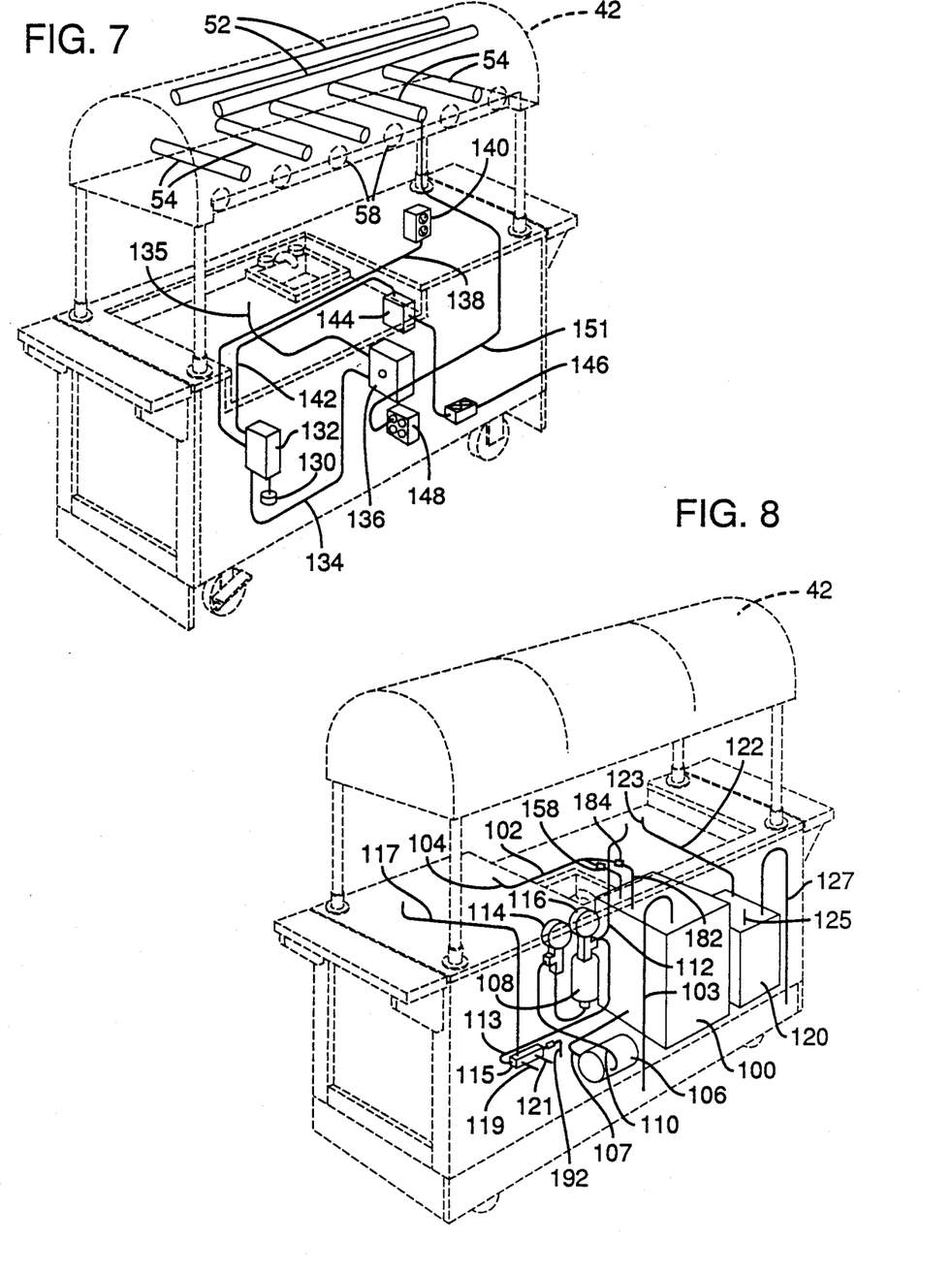
FIG. 7 is a schematic representation of the internal electric power circuitry and lighting fixtures used in the portable cabinet of the present invention, with the cabinet as viewed in FIG. 2 partially shown in phantom.
FIG. 8 is a schematic representation of the fresh water and waste water plumbing systems used in the portable cabinet of the present invention, with the cabinet as viewed in FIG. 1 partially shown in phantom.

A canopy 42 is supported on the frame by a plurality of vertical members 44, which are preferably cylindrical steel tubes plated with a selected finish to provide an attractive appearance. Canopy 42 has a generally half-cylindrical shape with an arcuate upper side 46 and a flat bottom 48 and is formed of fire retardant fabric stretched over a frame of semi-circular hoops 50 supported on vertical members 44. The flat bottom surface 48 of canopy 42 is also preferably covered with fire retardant fabric material. Within the interior of canopy 42 are a plurality of light fixtures 52, 54, as shown in FIG. 8. The light fixtures include both long and short fluorescent-type lamps mounted transverse to one another and supported by any suitable means within the interior of the canopy. The semicircular opposite ends 41 and 43 of canopy 42 are made of flat, solid material, covered with the same fire retardant fabric as the rest of the canopy, on which a merchandising logo can be displayed. As a merchandising option, an opening can be formed in the flat, solid material (not shown) underlying the logo at each end of the canopy, permitting light from the light fixtures in the canopy to illuminate the logo from behind.

Also mounted within canopy 42 are a plurality of conventional cup dispensers 56 for dispensing empty cups of various sizes for serving hot beverages. Referring to FIG. 2, cup dispensers 56 are oriented horizontally and supported by any suitable means within the canopy so that cups within the dispensers, which are stored in the well known manner nested within one another, are in the form of horizontal columns. Dispenser openings 58 are formed in the canopy on the side of the canopy corresponding to the rear of the cabinet. A recessed corner 60 is formed along a portion of the rear of the canopy, the vertical side 62 of which contains the dispenser openings 58. Corner recess 60 extends horizontally along a portion of the length of canopy 42 at the rear of the cart, but does not extend all the way to the semi-circular sides 41 and 43 of the canopy. As such, corner recess 60 is not ordinarily visible to patrons of the cabinet standing along the front 20 and sides 16, 18 of the cabinet.

A counter top 68 on the frame, shown in FIGS. 1, 2, 4 and 6, includes two horizontal surfaces, called first and second surfaces, which are at different levels relative to the frame. The two horizontal surfaces are designed to accommodate different types of hot beverage preparation appliances, as described below. First surface 70 of counter top 68 defines a recess within a portion of second surface 72. Second surface 72 extends to the front 20 and sides 16 of the cabinet, adjoining them along the front top edge 74 and side top edges 76 and 78 of the cabinet, respectively. Second surface 72 also extends around recessed first surface 70 in the form of a ridge 80 which is at the level of second surface 72 along the front and sides of the cabinet. First surface 70, within its recess, extends only to the rear of the cabinet, adjoining the rear at indentation 23, along the upper edge of rear panel 22. Vertical surfaces 84 extend between the upper and lower surfaces, 70 and 72, respectively, along the periphery of the recess formed by lower surface 70. The entire top counter 68, including vertical surfaces 84, is preferably formed of a high-grade counter material such as Corian, manufactured by DuPoint of Wilmington, Del.

Figure 6:
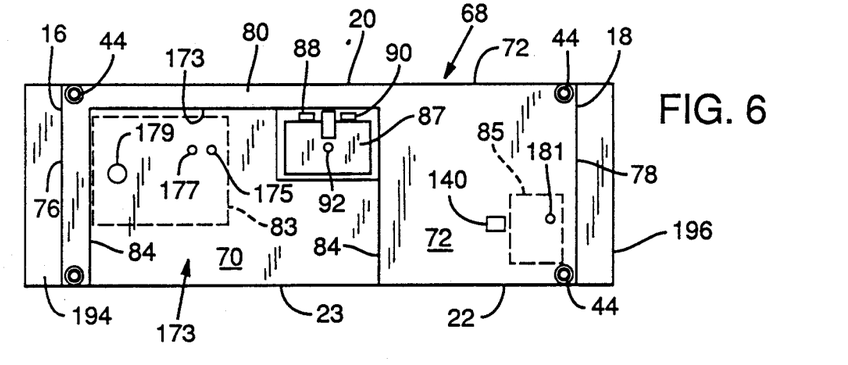
FIG. 6 is a top plan view of the counter top of the portable cabinet shown in FIGS. 1, 2, 4 and 5 as viewed from below the canopy.

The counter top accommodates at least two different hot beverage preparation stations, one for espresso-making and one for coffee-making. FIG. 6 illustrates in dashed lines the relative positions of the two beverage preparation stations on counter top 68. Recessed first surface 70, also called the lower level of the counter top, includes thereon a first hot beverage preparation station at 83, designed to accommodate an espresso-making appliance. Second surface 72, also called the upper level of the counter top, which has ridge 80 at one end and a broad flat surface at the other end, includes a second hot beverage preparation station at 85 on the broad flat surface, designed to accommodate a coffee-making appliance. As described below, connections for water and power are provided within the cabinet to first preparation station 83 on lower level 70 and second preparation station 85 on upper level 72 to facilitate operation of the respective hot beverage preparation appliance at each station.

To facilitate clean-up and provide a convenient source of water, a sink 87 is recessed into counter top 68 within lower level 70 of the counter top. The sink can be of any conventional kind and, in the preferred embodiment, includes both hot and cold faucets 88 and 90, respectively. Sink 88 also preferably includes a bottom drain 92 which connects to a waste water disposal system described below.

Figure 9:
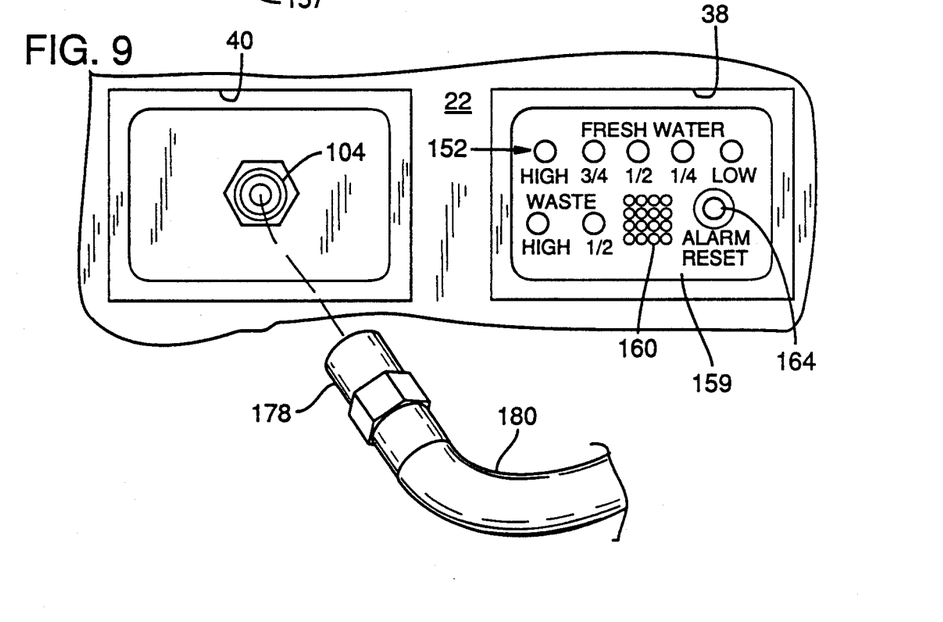
FIG. 9 is an enlarged elevation view of the indicator and alarm panel and inlet line hose coupling on the rear panel of the cabinet, together with a partial schematic representation of an inlet line fill hose.

Referring to FIG. 8 a water supply system is provided within cabinet 10 so that the cabinet may be used at locations without a direct connection to fresh water. All elements of the water supply system, including the holding tank, tubing and associated fixtures described below, are food grade and the system is designed to deliver potable water. The water supply system includes a first holding tank 100, which is of food grade, for receiving and storing clean potable water from an external source. An inlet conduit in the form of inlet tube 102, formed of food grade hose or PVC, extends from a first hose coupling 104 (FIG. 9) mounted within opening 40 on back panel 22 of the cabinet, as shown in FIGS. 2 and 9. Inlet tube 102 extends from hose coupling 104 to holding tank 100 and is used to fill the holding tank. A vent tube 103 admits air to tank 100.

Plumbing is also provided internal to cabinet 10 for moving potable water from holding tank 100 to the first and second beverage preparation stations 83 and 85, respectively, on counter top 68 and to sink 86. The plumbing system includes a pump 106, preferably of the demand type which switches on whenever a drop in pressure on the output side of the pump indicates demand for water. A suitable pump for this purpose is The "Shurflo," Model Series 200, manufactured by Flojet of Anaheim, Calif. Pump 106 draws water from tank 100 through a pump inlet line 107 and delivers fresh water to the various water receiving points in the cabinet, as described below.

Because espresso and coffee are beverages made predominantly of water, the purity of the water delivered to the beverage preparation stations on top surface 68 must be assured. The present invention incorporates a filter means as part of the water supply system to filter all water used in beverage preparation. Filter means includes a replaceable filter cartridge 108, such as Quick Disconnect Model 9950 from Techni-Brew International, distributed by Boyd Coffee Company of Portland, Oreg. A filter inlet conduit in the form of tubing 110, which extends from pump 106 to the filter 108, and a filter outlet conduit in the form of tubing 112 and 113, connects the filter to the water supply system. Tubing 112 and 113 serve as the filter outlet to the rest of the water supply system. A pair of gauges 114 and 116 mounted, respectively, on filter inlet tube 110 and filter outlet tube 112, 113 indicate the water pressure in each line. By reading the pressure on first pressure gauge 114 and comparing it with the pressure reading on second pressure gauge 116, the condition of filter element 108 can be determined. A significant pressure difference indicates that the filter is clogged or otherwise requires servicing. Access to the interior of cabinet 10 to read gauges 114 and 116 is available through doors 26 and 28 of rear panel 22.

After fresh water is filtered through filter 108, it is distributed to various points in the cabinet through tubing lines 112 and 113. Line 112 carries water to first beverage preparation station 83 on lower level 70 of counter top 68, to supply water to the espresso machine. Line 113 delivers water to a suitable manifold 115, from which several tubing lines emerge. One line 117 extends to second beverage preparation station 85 on upper level 72 of the counter top to supply water to the coffee machine. In the preferred embodiment, sink 87 includes first and second faucets, the second faucet being for hot water, and the water supply system includes a hot water heater and means for delivering water from tank 100 through the water heater to the second faucet on the sink. Water to the sink faucets is supplied through two other lines 119, 121 (partially shown in FIG. 8), which emerge from manifold 115 and connect respectively to the hot and cold water faucets on sink 87. A separate hot water heater (not shown) heats the water through line 119, before delivering to hot water faucet 88 on sink 87.

A waste water system is mounted on the frame for receiving and storing, for external disposal, waste water generated during preparation and dispensing of hot beverages. The waste water system includes a second holding tank 120 on the frame for storing waste water and a waste water plumbing system, which is illustrated schematically in FIG. 8. The waste water plumbing system includes a first waste conduit in the form of tube 122 extending between a waste water connection 123 with the hot beverage preparation appliance supported on lower level 70 and tank 120. A sink waste conduit (not shown) extends from the drain 92 in sink 87 to tank 120, at 125 for removing liquids from sink drain 92 to the waste holding tank. Another waste conduit could be provided between tank 120 and second hot beverage preparation station 85, if desired.

Water holding tank 120, sink drain 92 and sink drain conduit 123 are configured to provide an overflow means which directs waste water into sink 87 when waste tank 120 begins to overflow. The overflow function is accomplished by permitting the waste tank to overflow upwards through the sink waste conduit and into sink 87 through drain 92. As long as no other pathway is provided for the water to flow out of waste tank 120, such as through waste tank vent tube 127, the overflow of waste tank liquid into sink 87 will occur. Waste tank vent tube 127 is configured to extend above the level of the bottom of sink 87 in order to prevent that alternative flow path. The back up of waste water liquid in sink 87 provides an indicator to a person working behind cabinet 10 that waste tank 120 is full.

Figure 5:
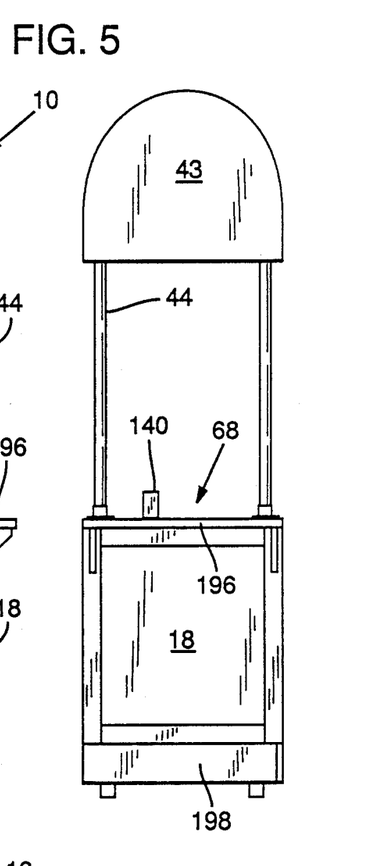
FIG. 5 is an elevation view of one side of the cabinet as shown in FIG. 4.

Power for operating devices in the cabinet, including the canopy lights 52 and 54, pump 106, various sensors and indicators described below, as well as hot beverage preparation appliances on the upper and lower hot beverage preparation surfaces 70 and 72, is supplied through a power supply system illustrated schematically in FIG. 7. The power supply system on the cabinet frame includes a power receiving receptacle 130 mounted on the underside of cabinet 10. Receptacle 130 can be of any conventional type suitable for safely delivering electric power to the cabinet at a voltage of between 208 volts and 240 volts, for example, a four-pronged self-locking flanged receptacle, into which an external cooperating plug (not shown) can be inserted. The power supply system feeds 208-volt to 240-volt power (hereinafter referred to as 220-volt power) from flanged inlet 130 to a breaker panel 132 for distribution to other locations within the cabinet. A first power distribution line 134 delivers 110-volt or 220-volt power to a relay box 136, the purpose of which is described below. A first beverage station electric distribution line 135 distributes power from relay box 136 to an espresso machine at the first hot beverage preparation station 83 on lower level 70 of counter top 68. The power carried on line 134 nd distributed through relay box 136 can be 110-volt or 220-volt, as required by the equipment being operated, and in the preferred embodiment is 220-volt power. A second beverage station power distribution line 138 supplies power from breaker panel 132 to a receptacle 140 on upper level 72 of counter top 68. Second station power distribution line 138 is designed to supply 110-volt power to a coffee maker at second hot beverage preparation station 85. Receptacle 140 can be of any conventional type such as a two-socket upright receptacle of the "tombstone" type into which a coffee maker or other appliance can be plugged. Second station power distribution circuit 138 does not pass through relay box 136. A third power distribution circuit 142 carries power from breaker panel 132 to a junction box 144 for distribution to suitable outlets, for example 146 and 148, within the cabinet. A canopy power line 151, extending between canopy 42 and one of the internal cabinet outlets, supplies power to the light fixtures within the canopy. The preferred embodiment of the cabinet includes a refrigerator 36, shown in FIGS. 2 and 5, and suitable ventilation fan (not shown), both of which can be plugged into outlet 146. Pump 106 is supplied power through outlet 148. The number and type of circuit breakers or other conventional protective devices within breaker panel 132 is a matter of final design choice within the scope of the present invention.

Several protective and indicator devices are incorporated into the cabinet 10 in order to protect hot beverage preparation appliances on the cabinet against operation without water and to prevent overflow of the holding tanks. The protective and indicator devices are responsive to water level sensors which are provided in holding tanks 100 and 120.

Figure 3:
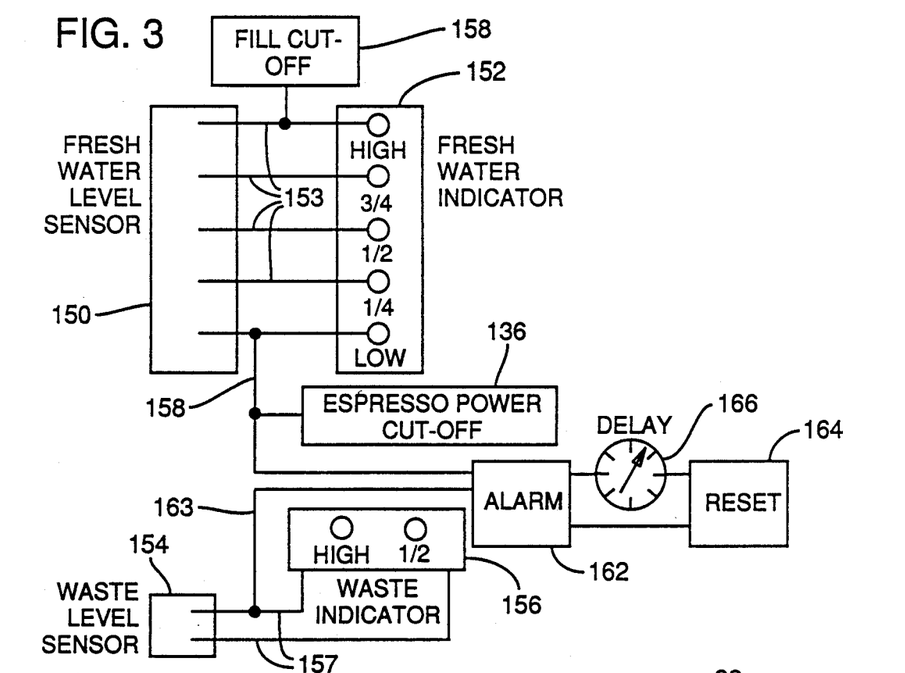
FIG. 3 is a schematic representation of the circuitry used in the water level indicators, power cut-off protective devices and alarm system used in the portable cabinet of FIGS. 1 and 2.
Figure 4:
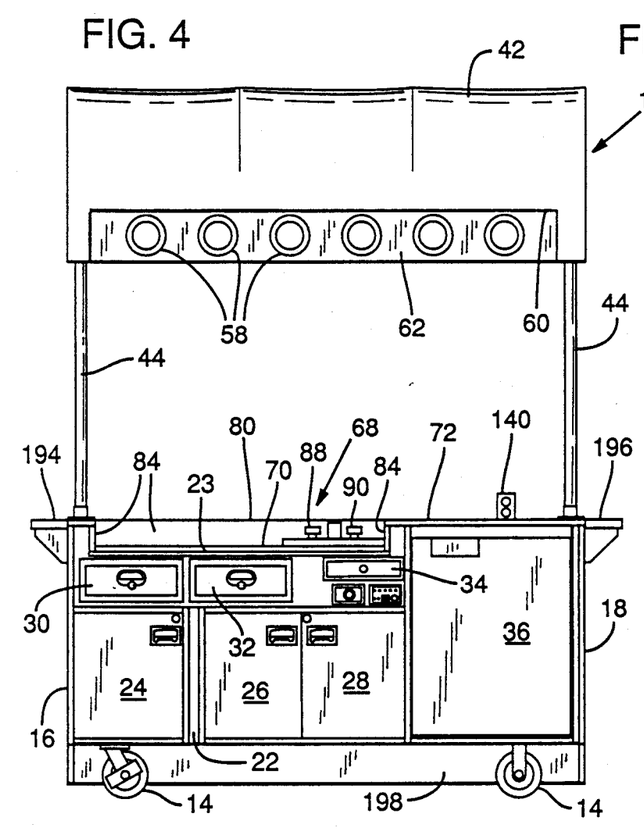
FIG. 4 is an elevation view of the rear of the cabinet shown in FIGS. 1 and 2.

FIG. 3 illustrates schematically the operation of the holding tank sensors and responsive devices. A water level sensing device is provided in fresh water tank 100, called first sensor 150. In the preferred embodiment, first sensor 150 is formed of a plurality of solid-state probes disposed at different levels in tank 100. A first indicator 152 responsive to first sensor 150, for indicating the level of fresh water in tank 100, is provided on the back panel of cabinet 10, within opening 38. First indicator 152 indicates the approximate level of water in tank 100 by means of a plurality of indicator lights as shown in FIGS. 3 and 9. Sensor 150 includes five probes approximately equally spaced at different levels in tank 100 with appropriate circuitry to illuminate all five indicator lights on indicator 152 when tank 100 is full. Each of the five probes emerges from the water, in turn, as water is drawn from the tank, causing the indicator lights to go out sequentially The five indicator lights on indicator 152 show the following five water levels: HIGH (or full), ¾, ½, ¼ and LOW (or empty). Lines 153 in FIG. 3 extend between sensor 150 and indicator 152 to illuminate the indicator lights when water is detected at the level of each sensor probe. The probes used in sensor 150 are conductors mounted in stainless steel, which each complete a circuit to a ground probe in tank 100 when water is at or above the level of the probe. Other types to sensors, for example a float-type level detector, could alternatively be used.

Similarly, waste tank 120 includes a second indicator means 154 consisting of a sensor 154 like sensor 150 having a plurality of probes within tank 120. A second indicator 156 on back panel 22 is responsive to sensor 154 and indicates the approximate level of liquid in tank 120. Two probes are used in the waste tank sensor and two indicator lights, indicating HIGH and ½, are provided on panel 156. Lines 157 extend from the probes in sensor 154 to indicator lights 156.

Two protective devices are directly responsive to the fresh water level sensor 150. When sensor 150 indicates that the fresh water holding tank is full (i.e., "HIGH") a signal is also sent to a solenoid-operated valve 158 on fresh water inlet line 102 (see FIG. 8). The HIGH signal from sensor 150, if activated while the fresh water tank is being filled from an external source, will shut off the incoming water automatically by means of valve 158, which is referred to in FIG. 3 as the fill cut-off 158. Valve 158 serves as a fill cut-off means which is responsive to fresh tank level sensor 150 and closes valve 158 to interrupt the flow of water through inlet conduit 102 when the fresh water holding tank 100 is full. Fill cut-off 158 thus prevents overflow of the fresh water holding tank when it is being filled from an external source. The other protective device responsive to sensor 150 responds when the water level in tank 100 falls below the "LOW" signal probe and the "LOW" light on indicator 152 goes off. That triggers a null condition on line 158 which automatically interrupts the power to at least one of the hot beverage preparation stations on top counter 68. In the preferred embodiment, it is power to the espresso machine at first beverage preparation station 83 which is interrupted. The means for interrupting power is relay box 136, which controls the power to lower level 70. Once the signal from detector 150 to the "LOW" indicator on panel 152 is interrupted, indicating that the water level in tank 100 is below the lowest probe in sensor 150, relay box 136 (FIG. 7) responds by cutting off the power to line 135 and to the espresso machine it is connected to. The reason for cutting off power to the espresso machine when tank 100 is nearly empty is because espresso machines are susceptible to costly damage, for example due to burning out the internal pump, if operated without water. The automatic espresso power cut-off protects the espresso machine.

As part of the protective system built into cabinet 10, an alarm in the form of an audible buzzer or other suitable annunciator is provided. Referring to FIG. 9, display panel 159 includes an alarm annunciator speaker 160 through which the annunciator sounds. Operation of the alarm is illustrated schematically in FIG. 3, box 162 representing the alarm and annunciator circuitry. When the "LOW" signal on fresh tank level sensor 150 is interrupted, indicating that tank 100 is nearly empty, line 158 goes null and alarm 162 responds by producing an audible alarm signal This occurs simultaneously with the cutoff of power to the espresso machine by relay box 136. Alternatively, alarm 162 is triggered when waste tank level sensor 154 indicates "HIGH," producing an affirmative signal on line 163 which is sent to a second input on alarm 162. The alarm responds by producing an audible signal.

Alarm 162 includes an alarm reset capability in the form of a reset button 164 on indicator panel 159. In the schematic representation of FIG. 3 reset button 164 deactivates the audible alarm of alarm system 162 and activates a reset delay 166, which includes means for reactivating the audible alarm after a selected time interval, for example, two minutes. Thus, whenever alarm 162 sounds, indicating either low water in the fresh water holding tank or a full waste tank, a person working behind cabinet 10 can deactivate the alarm temporarily by pressing reset button 164. The alarm will then reactivate in two minutes. This process is repeated until the cause of the alarm, either low fresh water or high waste water, is corrected.

The dimensions of cabinet 10, and in particular the dimensions of the first and second hot beverage preparation surfaces 70, 72 on the respective lower and upper levels of counter top 68, are determined by the size and orientation of the hot beverage making appliances used on the cabinet. FIG. 6 is an overhead view of counter top 68 with an espresso machine at first station 83 on lower level 70 and a coffee-making machine at second station 85 on upper level 72. As viewed in FIG. 6 the espresso machine has a rectangular overhead cross-section with espresso-making controls, dispensers and steam tubes on the back of the machine, which is the side oriented toward the bottom of FIG. 6. As such, the controls and dispensers on the espresso machine are on the side of the machine which corresponds to the rear 22 of cabinet 10. To facilitate espresso-making and the preparation of espresso and hot milk beverages using the espresso machine, lower level 70 and the recess within upper surface 72 formed by lower level 70 should be sufficiently deep to accommodate both an espresso-making appliance and additional counter space 173 at least wide enough to place a coffee cup on counter space indicated generally at 173 between the espresso-making appliance and the rear 22 of cabinet 10. In the preferred embodiment, cabinet 10 is manufactured to accommodate a Reneka Fully Automatic Espresso Machine, Model No. GAV 30-D/PLUS/EXPERT, manufactured in France, which has an overall depth, front-to-back, of approximately 20 inches. Accordingly, first hot beverage preparation station 83 within the recess created by lower level 70 within counter top 68 should preferably be at least 28 inches deep, measured from back edge 23 of the lower level of counter top 68 to the back edge 173 of ridge 80. By leaving sufficient counter space behind the espresso machine, a person preparing espresso and other hot beverages has a convenient and efficient work space on which to place espresso cups, milk steaming pitchers and the like. In particular, the lower level 70 of counter top 68 will preferably have room both for an espresso-making appliance and additional counter space at least wide enough to place a 32 ounce stainless steel steaming pitcher on the additional counter space adjacent the machine, as viewed from the rear of the cabinet.

Additional features of the layout of first hot beverage preparation station 83 on the lower level 70 of counter top 68 are shown in FIG. 6. Station 83 is designed to accommodate an espresso machine of the fully automatic type. A fully automatic espresso machine refers to a machine which heats measured amounts of water for espresso preparation, automatically grinds a predetermined quantity of coffee, prepares the espresso or cappuccino and then dumps the coffee grounds to ready the machine for the next round of beverage preparation. Espresso-making station 83 provides not only the work and counter space for the espresso machine but includes connections for fresh water, through opening 175, a waste water drain through opening 177 and an opening for coffee ground disposal 179. Openings 175, 177 and 179 extend through counter top 68, the first two permitting hose or PVC tubing connections to the espresso machine and the latter opening directly above a receptacle for catching used coffee grounds. In the preferred embodiment, the coffee grounds from the espresso machine on lower level 70 of counter top 68 will fall through opening 179 into a suitable container such as a bucket stationed below the opening which is accessible through door 24 (FIGS. 2, 4) on the rear side of the cabinet. Alternatively, coffee grounds could be caught by a tray within drawer 30 or by another suitable means. An electric power connection to the espresso machine at station 83 may be provided through an additional suitable opening (not shown).

The second hot beverage preparation station 85 on upper level 72 of counter top 68 is the coffee-making station and requires only an opening 181 for the fresh water line extending through the counter top to the coffee-making appliance. The remainder of the space on upper level 72 of counter top 68 can be used for placement of a cash register, coffee dispensing containers, merchandising material or any other desired purpose.

The preferred embodiment of cabinet 10 also includes means for filling and draining the holding tanks in the cabinet and for draining all water from the plumbing lines within the cabinet. Referring to FIGS. 2 and 9, fresh water tank 100 is filled by means of a first hose coupling 104, located on rear panel 22 within opening 40, adjacent indicator panel 159. First hose coupling 104 is releasably connectable to a cooperating coupling 178 on an external fill hose 180, which is of food grade and is supplied with the cabinet First hose coupling 104 is connected directly to inlet tube 102 (see FIG. 8), which extends between the first hose coupling and fresh water holding tank 100. Thus, water supplied through fill hose 180 to coupling 104 flows into the first holding tank. As noted above, a solenoid valve 158 will interrupt the flow of fresh water into tank 100 when the tank is full. Solenoid valve 158 can be bypassed by an inlet tube bypass 182, connected in parallel with valve 158 between inlet tube 102 and tank 100. A manual valve 184 mounted on bypass tube 182 permits tank 100 to be filled when electric power is unavailable to open solenoid valve 158. Manual valve 184 is accessible through rear doors 26 and 28 and is available as a convenience, although it will be understood that the opening of valve 184 disables the protective function of solenoid valve 158 against overflow.

Referring to FIGS. 2 and 8, waste water tank 120 is drained through a second hose coupling 186 on the underside of cabinet 10. Second hose coupling 186 is connected by a suitable tube (not shown) to waste tank 120 so that liquid in tank 120 flows to hose coupling 186. Second hose coupling 186 is releasably connectable to a cooperating coupling 188 on an external waste hose 190 for draining waste tank 120. First hose coupling 176 and second hose coupling 186 are made incompatible with one another such that the cooperating couplings releasably connected to the respective hoses will not inadvertently be used on the wrong hose coupling. For example, first hose coupling 176 is of the male type with cooperating coupling 178 on fresh water fill hose 180 being of the female type. Second hose coupling 186 is of the female type, with cooperating coupling 188 on drain hose 190 being of the male type. The coupling are also of different sizes and types to eliminate the possibility of interchange. In that way, the fill and drain hoses cannot inadvertently be connected to the wrong coupling, thus preventing contamination of the fresh water tank 100 by use of drain hose 190 to fill the tank. Hoses 180 and 190 are also be made of different material and are of different colors to further clarify their intended use.

Additional drains are provided on cabinet 10 to drain all water from the cabinet if necessary to prevent freezing or for shipping. For example, a drain (not shown) is provided in the bottom of fresh water tank 100. Referring to FIG. 8, a fresh water plumbing system drain 192, connected to the plumbing lines at the lowest point, manifold 115, is accessible through rear cabinet doors 26, 28 and serves to drain the plumbing system of all water.

Additional features of the preferred embodiment of cabinet include provision for side shelves 194 and 196 (see FIGS. 1, 2, 4, 5 and 6), which are in the form of add-on extensions to counter top 68 at the level of upper level 72. A skirt 198 extends around the sides and front of cabinet 10 and is preferably formed of wood attached by hinges to side panels 16, 18 and front panel 20 to permit the skirts to be swung out of the way when cart 10 is lifted by a fork lift.

The hot beverage preparation cabinet of the present invention serves both to facilitate the operation of hot beverage preparation appliances such as espresso machines and coffee-making machines and also provides a convenient and attractive counter from which to merchandise hot beverages. With the provision of electric power from an external source, the cabinet becomes a fully self-contained hot beverage dispensing station in which all the essentials for preparing and serving hot beverages in an attractive and hygienic environment are provided. The recessed lower level of the top counter is particularly adapted to the preparation of espresso, including all necessary plumbing and power connections for an espresso machine, sufficient space to conveniently work behind the machine and an attractive, recessed work area which helps shield and contain any spills or splatters generated during the preparation of espresso and espresso and milk beverages. The upper level of the counter top conveniently includes all necessary plumbing and power connections for a coffee maker and has sufficient room for coffee dispensers. The upper level of the top counter also has sufficient room to place a cash register on its surface and provides a serving surface for customers standing adjacent to the front of the cabinet. Storage compartments and drawers for supplies, disposal of coffee grounds, and the nightly securing of equipment complete the self-contained hot beverage serving unit. The cabinet can be conveniently drained of all water for transport or storage in sub-freezing climates. It also offers assured protection against damage to expensive internal parts of espresso machines from inadvertent operation without water. Other safety features include holding tank level indicators and built-in alarms to alert a person preparing hot beverages to lack of water in the fresh water tank or a potential overflow condition in the waste water tank. The present invention thus permits the preparation and serving of hot beverages at locations remote from direct water connections.

The cabinet can also function while directly connected to a water supply, which will automatically keep the fresh water tank full. A drain line can also be continuously connected to the cabinet.

The embodiment shown and described may be modified within the scope of the present invention to include, for example, additional hot beverage preparation stations on the upper or lower preparation surfaces and alternative lighting or displays. Other modifications might include, for example, the use of an internal electric power supply such as batteries to operate the cabinet at locations remote from a direct power connection, together with propane to heat water in the espresso and coffee machines. Facilities to accommodate customer self-service, such as the provision of cup dispensers on the front side of the canopy, would also be possible. While reference herein has been made to coffee and espresso beverages, the cabinet could also be used to prepare other hot beverages such as teas, bouillons or soups.

The present invention provides a portable cabinet which supports and enhances the operation of hot beverage preparation appliances, such as espresso and coffee-making machines. The cabinet is in the form of a portable cart which incorporates a self-contained water supply and waste water disposal system and which incorporates a clean and pure water supply appropriate for the preparation of espresso and gourmet coffee. The cabinet includes all items necessary to the preparation of espresso, gourmet coffee and other hot beverages, such as a refrigerator for milk and other perishables, storage space for all items necessary to prepare and serve hot beverages and an overall design which is easy to keep clean and meets National Sanitation Foundation standards.

What is claimed is:

1. A portable cabinet for supporting and facilitating the operation of hot beverage preparation appliances and for dispensing hot beverages, comprising:

a rectangular frame mounted on a plurality of wheels, two parallel end panels on said frame forming the sides of the cabinet, a rectangular front panel on said frame forming the front of the cabinet and a rear panel on said frame forming the rear of the cabinet, said rear panel being parallel with said front panel and including means forming openings in said rear panel for access to the interior of the cabinet, a counter top on said frame including first and second horizontal surfaces at different levels relative to said frame for supporting hot beverage preparation appliances thereon, said first surface defining a recess within a portion of said second surface, said second surface extending to the front and sides of the cabinet and including a ridge at the level of said second surface which extends around said first surface along the front and sides of the cabinet for preventing liquids on said first surface within said recess from flowing over the front and sides of the cabinet, said first surface extending to the rear of the cabinet, said first surface including a first hot beverage preparation station thereon for supporting a hot beverage preparation appliance and said second surface including a second hot beverage preparation station thereon for supporting another hot beverage preparation appliance, a sink on said counter top recessed into said first surface and a water faucet on said sink, a first holding tank on said frame for receiving and storing clean water for use in hot beverage preparation, water supply means within said cabinet for supplying water from said first holding tank to said first and second hot beverage preparation stations and said water faucet on said sink, power supply means on said frame for receiving electric power from a source external to the cabinet and for distributing electric power to a plurality of locations in the cabinet including said first and second hot beverage preparation stations, canopy means extending over said counter top supported on said frame by a plurality of vertical members, and a plurality of cup dispensers supported on said canopy means for dispensing empty cups.

2. A portable cabinet as in claim 1 in which said water supply means further includes an inlet conduit for delivering clean water from a source outside the cabinet to fill said first holding tank, first sensor means for sensing the level of water in said first holding tank and fill cutoff means responsive to said first sensor means for interrupting the flow of water through said inlet conduit when said first holding tank is full to prevent overflow of said first holding tank.

3. A portable cabinet as in claim 2 including power cutoff means associated with said power supply means and responsive to said first sensor means for interrupting the power to at least one of said first and second hot beverage preparation stations when said first holding tank is substantially empty thereby preventing damage resulting from operation without water to a hot beverage preparation appliance supported on said at least one of said first and second hot beverage preparation stations.

4. A portable cabinet as in claim 3 including a waste water system on said frame for receiving and storing for external disposal waste water generated during the preparation and dispensing of hot beverages, including a second holding tank on said frame for receiving and storing waste water, second sensor means for sensing the level of water in said second holding tank and alarm means responsive to said second sensor means for producing an audible alarm when said second holding tank is full.

5. A portable cabinet as in claim 4 in which said sink includes a drain in the bottom thereof and said waste water system further includes a sink waste conduit for moving liquids from said drain to said second holding tank, and overflow means for directing waste water into said sink when said second holding tank is full.

6. A portable cabinet as in claim 1 including first sensor means for sensing the level of water in said first holding tank, a waste water system on said frame for receiving and storing for external disposal waste water generated during the preparation and dispensing of hot beverages, said waste water system including a second holding tank on said frame for receiving and storing waste water, second sensor means for sensing the level of water in said second holding tank, first indicator means on said back panel responsive to said first sensor means for indicating the approximate level of water in said first holding tank, second indicator means on said back panel responsive to said second sensor means for indicating the approximate level of liquid in said second holding tank, and alarm means responsive to said first and second sensor means for producing an audible alarm when one of the following occurs: said first sensor means senses that said first holding tank is empty, said second sensor means senses that said second holding tank is full.

7. A portable cabinet as in claim 6 including alarm reset means on said back panel for deactivating the audible alarm of said alarm means when activated in response to said first and second sensor means, said alarm reset means further including means for reactivating the audible alarm of said alarm means after a selected time interval.

8. A portable cabinet as in claim 1 in which said water supply system includes filter means on said frame for filtering all water flowing out of said first holding tank before the delivery to said first and second hot beverage preparation stations and to said water faucet on said sink.

9. A portable cabinet as in claim 8 in which said water supply system further includes a filter inlet conduit to deliver water from said first holding tank to said filter means, a filter outlet conduit for moving water from said filter means after filtration to said first and second hot beverage preparation stations and said sink, a first pressure gauge on said filter inlet conduit and a second pressure gauge on said filter outlet conduit whereby the water pressure in said filter inlet and outlet conduits can be conveniently compared to determine the condition of said filter means.

10. A portable cabinet as in claim 1 in which the hot beverage preparation appliance at said first hot beverage preparation station is an espresso-making appliance oriented such that the controls and dispensers thereon are on the side corresponding to the rear of the cabinet, wherein said first surface of said top counter and the recess formed thereby is sufficiently deep to accommodate both said espresso-making appliance and additional counter space at least wide enough to place a 32 ounce steaming pitcher thereon between said espresso making appliance and the rear of the cabinet.

11. A portable cabinet as in claim 10 in which said counter top includes vertical surfaces extending between said first and second horizontal surfaces along the periphery of said recess.

12. A portable cabinet as in claim 1 in which said canopy means includes light fixtures within said canopy means extending over said counter top, said light fixtures being connected to said power supply means whereby said counter top is illuminated.

13. A portable cabinet as in claim 1 in which said plurality of cup dispensers supported on said canopy means are oriented horizontally such that empty cups disposed therein in nested fashion are in the form of horizontal columns, said canopy means including means forming a plurality of dispenser openings in said canopy means through which cups are dispensed, said dispenser openings from which cups are dispensed being at the rear of said canopy means corresponding to the rear side of the cabinet.

14. A portable cabinet as in claim 1 including a first hose coupling releasably connectable to a cooperating coupling on an external fill hose, an inlet conduit extending between said first hose coupling and said first holding tank such that water supplied through the external fill hose to said first hose coupling flows into said first holding tank, a waste water system on said frame for receiving and storing for external disposal waste water generated during the preparation and dispensing of hot beverages, including a second holding tank on said frame for receiving and storing waste water, a second hose coupling releasably connectable to a cooperating coupling on an external waste hose, said second hose coupling being connected by conduit means to said second holding tank such that liquid in said second holding tank flows to said second hose coupling, and wherein said first and second hose couplings are incompatible with one another such that the cooperating coupling releasably connectable to said first hose coupling on an external fill hose will not couple to said second hose coupling and the cooperating coupling releasably connectable to said second hose coupling on an external drain hose will not couple to said first hose coupling whereby inadvertent interchanging of the external fill and drain hoses is prevented.

15. A portable cabinet as in claim 1 in which said water supply means includes a demand pump on said frame for pumping water from said first holding tank to said first and second hot beverage preparation stations and said water faucet on said sink.

16. A portable cabinet for supporting and facilitating the operation of hot beverage preparation appliances and for dispensing hot beverages, comprising:

a rectangular frame mounted on a plurality of wheels, two parallel end panels on said frame forming the sides of the cabinet, a rectangular front panel on said frame forming the front of the cabinet and a rear panel on said frame forming the rear of the cabinet, said rear panel being parallel with said front panel and including means forming openings in said rear panel for access to the interior of the cabinet, a counter top on said frame including first and second horizontal surfaces at different levels relative to said frame for supporting hot beverage preparation appliances thereon, said first surface defining a recess within a portion of said second surface, said second surface extending to the front and sides of the cabinet and including a ridge at the level of said second surface which extends around said first surface along the front and sides of the cabinet for preventing liquids on said first surface within said recess from flowing over the front and sides of the cabinet, said second surface extending to the rear of the cabinet, said first surface including a first hot beverage preparation station thereon for supporting a hot beverage preparation appliance thereon and said second surface including a second hot beverage preparation station thereon for supporting another hot beverage preparation appliance, a sink on said counter top recessed into said first surface and a water faucet on said sink, a first holding tank which is of food grade on said frame for receiving and storing clean, potable water for use in hot beverage preparation, water supply means within said cabinet for supplying potable water from said first holding tank to said first and second hot beverage preparation stations and said water faucet on said sink, said water supply means further including an inlet conduit which is of food grade for delivering clean water from a source outside the cabinet to fill said first holding tank, first sensor means for sensing the level of water in said first holding tank and fill cutoff means responsive to said first sensor means for interrupting the flow of water through said inlet conduit when said first holding tank is full to prevent overflow of said first holding tank, power supply means on said frame for receiving electric power from a source external to the cabinet and for distributing electric power to a plurality of locations in the cabinet including said first and second hot beverage preparation stations, power cutoff means associated with said power supply means and responsive to said first sensor means for interrupting the power to at least one of said first and second hot beverage preparation stations when said first holding tank is substantially empty thereby preventing damage resulting from operation without water to a hot beverage preparation appliance supported on said at least one of said first and second hot beverage preparation stations, a waste water system on said frame for receiving and storing for external disposal waste water generated during the preparation and dispensing of hot beverages, including a second holding tank on said frame for receiving and storing waste water, second sensor means for sensing the level of water in said second holding tank, a drain in said sink, a sink waste conduit for moving liquids from said drain to said second holding tank and overflow means for directing waste water into said sink when said second holding tank is full, indicator means on said back panel responsive to said first and second sensor means for indicating the approximate levels of liquid in said first and second holding tanks, alarm means responsive to said first and second sensor means for producing an audible alarm when said first holding tank is empty and when said second holding tank is full, alarm reset means on said back panel for deactivating the audible alarm of said alarm means when activated in response to one of said first and second sensor means, said alarm reset means further including means for reactivating the audible alarm of said alarm means after a selected time interval, canopy means extending over said counter top supported on said frame by a plurality of vertical members, said canopy means including light fixtures within said canopy means extending over said counter top, said light fixtures being connected to said power supply means whereby said counter top is illuminated, a plurality of cup dispensers supported on said canopy means, said canopy means including means forming a plurality of dispenser openings therein through which cups are dispensed, said cup dispensers being oriented horizontally such that empty cups disposed therein in nested fashion are in the form of horizontal columns, and said dispenser openings being at the rear of said canopy means corresponding to the rear side of the cabinet.

17. A portable cabinet as in claim 16 including a first hose coupling releasably connectable to a cooperating coupling on an external fill hose, said first hose coupling being connected by said inlet conduit to said first holding tank such that water supplied through the external fill hose to said first hose coupling flows into said first holding tank, a waste water system on said frame for receiving and storing for external disposal waste water generated during the preparation and dispensing of hot beverages, including a second holding tank on said frame for receiving and storing waste water, a second hose coupling releasably connectable to a cooperating coupling on an external waste hose, said second hose coupling being connected by conduit means to said second holding tank such that liquid in said second holding tank flows to said second hose coupling, and wherein said first and second hose couplings are incompatible with one another such that the cooperating coupling releasably connectable to said first hose coupling on an external fill hose will not couple to said second hose coupling and the cooperating coupling releasably connectable to said second hose coupling on an external drain hose will not couple to said first hose coupling whereby inadvertent interchanging of the external fill and drain hoses is prevented.

18. A portable cabinet as in claim 16 in which the hot beverage preparation appliance at said first hot beverage preparation station is an espresso-making appliance oriented such that the controls and dispensers thereon are on the side corresponding to the rear of the cabinet, wherein said first surface of said top counter and the recess formed thereby is sufficiently deep to accommodate both said espresso-making appliance and additional counter space at least wide enough to place a 32 ounce steaming pitcher thereon between said espresso making appliance and the rear of the cabinet.

19. A portable cabinet as in claim 18 in which said counter top includes vertical surfaces extending between said first and second horizontal surfaces along the periphery of said recess.

20. A portable cabinet as in claim 16 in which said sink further includes a second faucet thereon for hot water, said water supply system including a hot water heater and means for delivering water from said first holding tank through said hot water heater to said second faucet on said sink.

* * * * *